March 29, 1938.　　H. B. WHITE ET AL　　2,112,318
OVERLOAD RELEASE CLUTCH
Original Filed July 31, 1931　　3 Sheets-Sheet 1
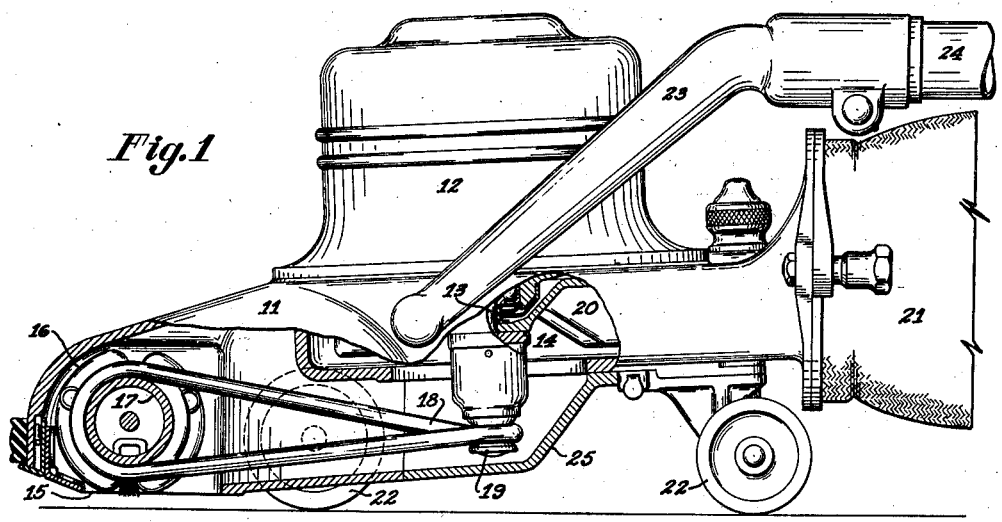
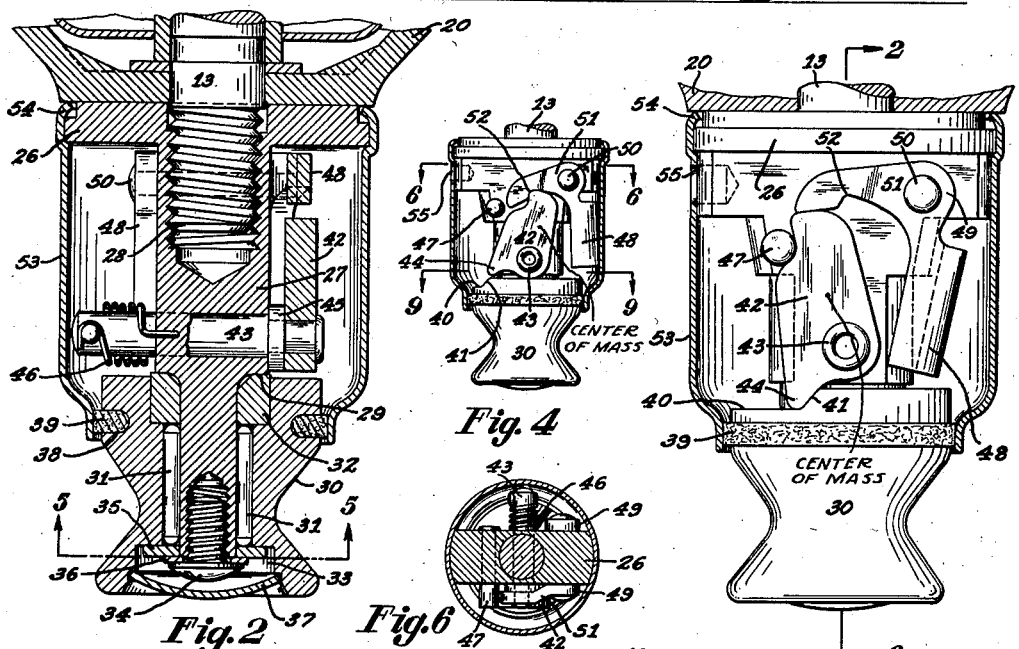
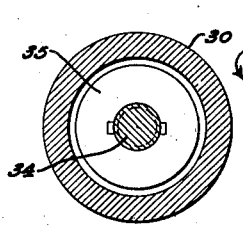
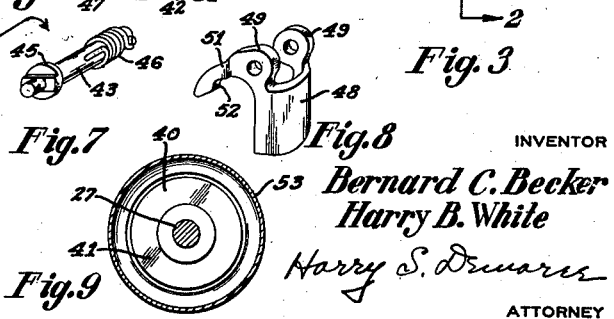
INVENTOR
Bernard C. Becker
Harry B. White
ATTORNEY

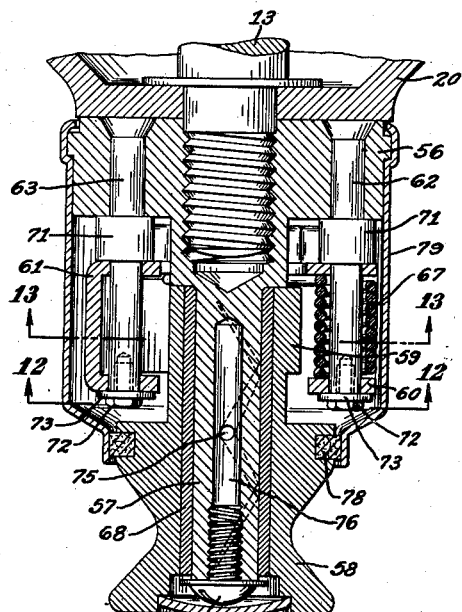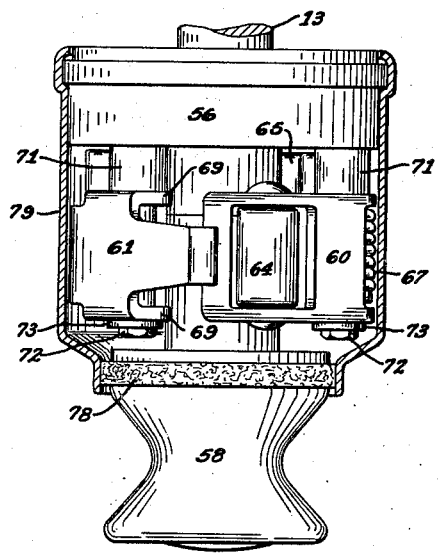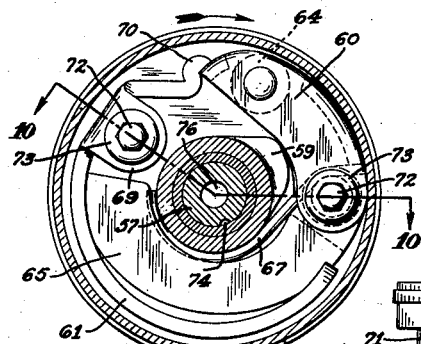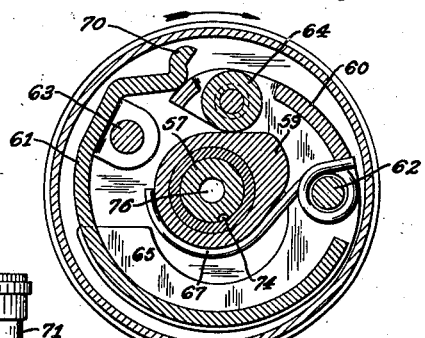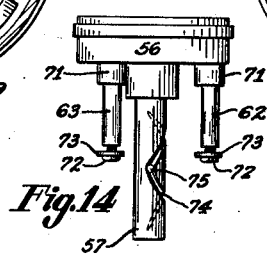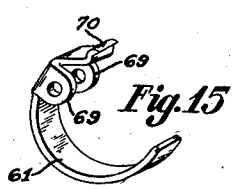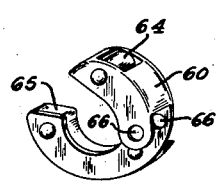
INVENTOR
Bernard C. Becker
Harry B. White
Harry S. Demarest
ATTORNEY

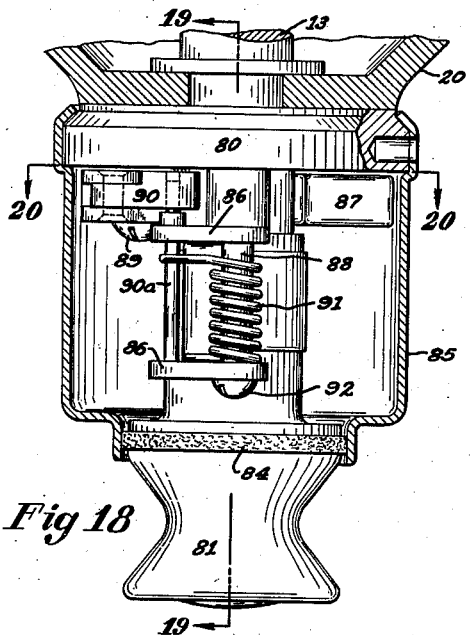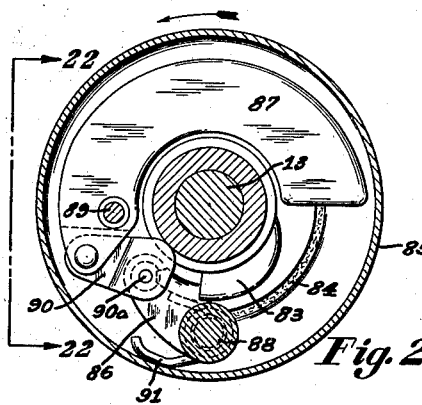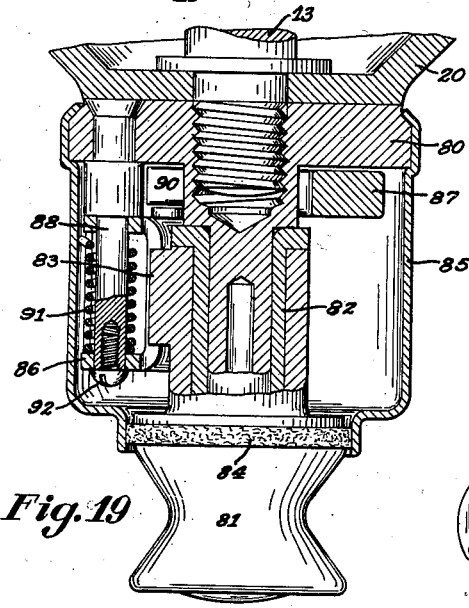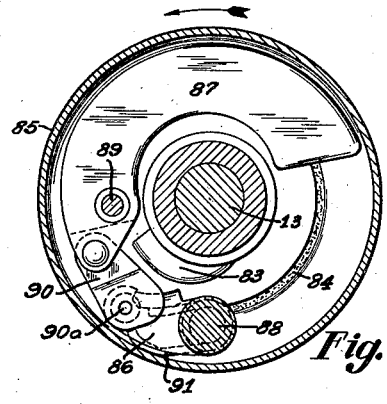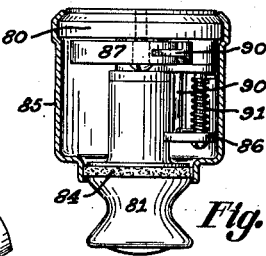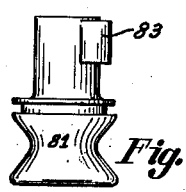

Patented Mar. 29, 1938

2,112,318

UNITED STATES PATENT OFFICE 2,112,318

OVERLOAD RELEASE CLUTCH

Harry B. White and Bernard C. Becker, Canton, Ohio, assignors to The Hoover Company, North Canton, Ohio, a corporation of Ohio Original application July 31, 1931, Serial No. 554,270. Divided and this application January 2, 1935, Serial No. 132. In Germany October 23, 1931

17 Claims. (Cl. 192—56)

This application is a division of our application for Letters Patent, Serial Number 554,270, filed July 31, 1931, the invention in which application relates to power-transmitting devices particularly applicable to suction cleaners of the type embodying a carpet-agitating or beating device to dislodge the dirt, in addition to a suction-producing means for effecting a current of air through and over the carpet or other surface covering undergoing cleaning. While the invention may be utilized in other structures, where similar operation is desired, it presents particular advantages when used to control the operation of a suction cleaner of this type, and is illustrated and described in such original application as embodied in various forms adapted to transmit power from the shaft upon which the fan is mounted to an agitator in such a cleaner.

In operation, the agitating device of a suction cleaner sometimes becomes overloaded or stalled by reason of the carpet, threads or other objects becoming caught between the agitator and the body of the cleaner particularly if the agitator is of the rotary type. If a worm drive, or other positive drive is used, overheating and breakage of the parts are apt to result, while, when a belt drive is used, the slipping of the belt usually saves breakage of the parts but soon results in excessive overheating which may injure the pulleys and adjacent parts and causes breaking or weakening of the belt. At the same time, the starting torque of the fan of a suction cleaner is very great, and to it, at starting, is added the starting load of the agitating device, and provision must be made to transmit a certain minimum of power for starting.

One of the objects of the invention is to provide a suction cleaner of this type in which the parts will be protected from injury in the event of overload or stalling of the agitating device and permitting continued operation of the fan, so that the cleaner will act as a straight air suction cleaner. A further object is to provide such a device in which, upon excessive load upon or stalling of the agitating device, the drive thereto will be disconnected automatically and will be held from reestablishment so long as the driving means is operated, a still further object being to provide for automatic reestablishment of the drive without necessitating manual reengagement of parts. Still another object is the provision of an overload-release clutch in such a suction cleaner which is efficient and compact.

Still further objects of the invention are to provide an overload release clutch of general utility in which there will be no danger of overheating or undue wear, to provide such a clutch which is assembled and can be handled as a unit, and to provide such a clutch which can be used as a terminal member on a shaft as distinguished from a clutch having its driving and driven parts mounted on separate alined shafts.

While the invention is disclosed herein as embodied in a suction cleaner structure, as in the original application of which this application is a division, it will be understood that the clutch structure is capable of general application, and still further objects of the invention, and the novel features of the invention will be apparent from the following description of various embodiments of the invention as illustrated in the accompanying drawings, in which:

Figure 1 is a fragmentary view in side elevation of a suction cleaner, with parts broken away to show more clearly the agitating device and the power transmitting means for operating it.

Figure 2 is an enlarged fragmentary view, in vertical transverse section, of the driving pulley and its operating means, taken on the line 2—2 of Figure 3.

Figure 3 is an enlarged view in side elevation of the parts shown in Figure 2, the casing or housing being shown in section and the elements of the clutch being shown in driving position.

Figure 4 is a view in elevation similar to Figure 3, but on a smaller scale and showing the parts as operated to non-driving position.

Figure 5 is a view in horizontal cross section taken on the line 5—5 of Figure 2.

Figure 6 is a view in horizontal cross section taken on the line 6—6 of Figure 4.

Figures 7 and 8 are views in perspective showing in detail various elements of the structure shown in Figures 1 to 6.

Figure 9 is a view in horizontal cross section on the line 9—9 of Figure 4.

Figure 10 is an enlarged view in vertical section, similar to Figure 2, and showing a second embodiment of clutch structure.

Figure 11 is an enlarged view in elevation similar to Figure 3 showing the driving elements of the clutch in driving relationship.

Figure 12 is a view in horizontal section of the structure shown in Figure 10 taken on the line 12—12 of Figure 10.

Figure 13 is a view in horizontal section, taken on the line 13—13 of Figure 10.

Figure 14 is a view in side elevation, on a reduced scale, of one of the clutch elements shown in Figure 10.

Figures 15 and 17 are views in perspective, on a reduced scale, of members of the clutch shown in Figure 10.

Figure 16 is a view in side elevation, on a reduced scale, of the driven member of the clutch and pulley shown in Figure 10.

Figure 18 is a view in side elevation, on an enlarged scale, similar to Figure 3 showing a third embodiment of clutch structure.

Figure 19 is a view in vertical section, on an enlarged scale, similar to Figure 2, taken on the line 19—19 of Fig. 18.

Figures 20 and 21 are views in horizontal section taken on the line 20—20 of Figure 18, showing the position of the clutch parts in driving relationship and non-driving relationship, respectively.

Figure 22 is a view in side elevation on a reduced scale, similar to Figure 18, but showing the parts rotated 90 degrees.

Figures 23, 24, and 25 are views in perspective, on a reduced scale, of various elements of the clutch structure shown in Figure 18.

Figure 26 is a view in side elevation, on a reduced scale, of the driven clutch member and pulley shown in Fig. 18.

As shown in Figure 1, the present invention is embodied in an overload-release clutch mechanism to transmit power to a driving pulley which, in turn, operates an agitating means. In all of the embodiments shown, the clutch mechanism is interposed between the motor shaft upon which a fan is mounted and the driving pulley, but it will be apparent that any suitable power transmitting means may be substituted for the pulley belt drive shown.

As shown in Figure 1, a main suction cleaner casing 11 carries a motor 12, having a vertical shaft 13, the casing having a fan chamber 14 therein connected to a nozzle opening 15, in which there is mounted a rotary member 16 which is adapted to agitate the carpet or surface covering being cleaned. The rotary agitator is provided with a driven pulley 17 connected by belt 18 with a driving pulley 19, mounted on the lower end of the motor shaft. A suction producing fan 20 is mounted upon the motor shaft above the pulley 19, discharging rearwardly into a dust filtering bag 21, and the cleaner as a whole is mounted upon supporting wheels 22 and provided with a bail 23 and a handle 24 by which it may be directed over the surface undergoing cleaning, it being understood that the nozzle opening 15 is elevated above the plane determined by the supporting wheels and that the carpet is drawn up against such opening by the suction creating means into the path of movement of the agitating means. A portion 25 of the lower wall of the main casing is preferably removable, and latched in place, to provide access to the pulley 19 and the belt 18.

In a suction cleaner of this type, the starting torque of the fan is comparatively high, decreasing as the fan approaches operating speed, but varying somewhat with the volume of air handled, which in turn is determined by the effective seal of the carpet against the suction mouth. While an agitator such as that shown in Figure 1, has an appreciable starting load, it is much less than the operating load effected by its engagement with the carpet when the carpet has been drawn up against the suction mouth. If a belt drive is used and the agitating means becomes stalled, or its operation is seriously impeded, the belt slips upon the smaller pulley, which is usually the driving pulley, overheating the parts and seriously injuring or destroying the belt. In accordance with the present invention, an overload release clutch structure is provided, between the shaft upon which the fan is mounted and the agitator, which is sufficiently compact to be interchangeable with the pulley structure normally used, which will permit operation of the fan while the parts are in their disengaged condition without overheating, which will normally transmit ample power for driving the agitator, and which upon disengagement will have the parts thereof positively held in disengaged position, thus obviating noise and wear of the parts which would result if the parts could move gradually towards engaged position.

The suction cleaner structure shown in Figure 1 is included in this application to illustrate an example of structure in which clutch structures of this type have particular utility, the present application being directed to the clutch structure itself, regardless of the other structure or structures with which it is used.

In the embodiment shown in Figures 1 to 9, the body member 26 of the driving part of the clutch is provided with a central portion 27 which is threaded upon the lower threaded end 28 of the motor shaft 13 and acts as a nut to secure the fan 20 to the shaft. The lower end of the portion 27 is reduced to form a shoulder 29, and upon this reduced end a pulley 30 is rotatably mounted upon pin roller bearings 31, a thrust ring 32 engaging the upper end of the bearing members 31 and the shoulder 29. The lower face of the pulley is preferably recessed at 33, and a screw 34 is threaded into the end of the portion 27 and provided with a wear disc 35 and washer 36, to hold the pulley 30 rotatably mounted upon the portion 27. The recess 33 is preferably closed by a disc 37 pressed therein, and the upper end of the pulley is preferably provided with an annular channel 38 to receive a dust excluding ring 39 of felt or similar material. The upper face of the pulley 30 is cut away, as shown at 40 in Figures 3, 4, and 9, to form an inclined and slightly rounded abutment or cam 41, which extends at a slight angle to the radius, and is adapted to receive the driving thrust by which the pulley is rotated.

The driving part of the clutch comprises a plate 42, secured to a laterally extending pivot pin 43 which is rotatably mounted in the member 27, the plate 42 being provided with a downwardly extending finger 44 normally in driving engagement with the abutment 41 but movable to a position above the top of the pulley, as shown in Figure 4. As shown in Figures 2 and 7, pin 43 is preferably provided with an integral thrust collar or flange 45, and it and the plate 42 are provided with inter-engaging parts to prevent relative rotation when they have been riveted together. A coil spring 46 surrounds the pin 43, engaging at one end with a projection on the pin 43 and at the other end in a notch in the body member 27, to rotate the plate member 42 toward driving position, in which position the upper end of the plate member 42 engages a suitable stop 47 on the body member 27.

A centrifugally operated latch 48 is pivotally mounted upon the body member 27, preferably having spaced lugs 49 on opposite sides of the body member 27, as shown in Figure 6, through which and the body member 27 a pivot pin 50 is engaged. The latch member 48 has an arm 51 extending over the plate member 42, and normally engaging frictionally against the end of the plate member 42, with a pressure dependent upon the speed of rotation, and normally assisting in holding the plate member 42 in driving position. The arm 51 is provided with a notch 52 which receives the end of the plate member 42 and holds it out of driving position as shown in Figure 4, when the plate member 42 has been forced to such position. Since the center of mass of the plate member 42, when in driving position, is at one side of the pin 43, it will be apparent that the centrifugal action tends to hold the plate 42 in driving position. When the member 42 is in such intermediate position that its center of mass is directly above the axis of the pin 43, on which member 42 is mounted, the center of mass is at a minimum distance from the vertical axis of rotation of the shaft 13 and member 27. If member 42 were held in such position of rotation about pin 43 its center of mass would define a circle about the vertical axis of rotation. However, the member 42 is mounted for rotation about pin 43 and its center of mass can move in a line tangent to such circle, so that as member 42 moves away from such intermediate position in either direction about the pin 43 its center of mass will be moving away from the vertical axis of rotation. Consequently, when the pulley is retarded sufficiently to cam the finger 44 out of the path of abutment 41 sufficient force must have been exerted to overcome the action of the spring 46, the centrifugal action upon the plate member 42 until it reaches center position, and the very considerable friction exerted by the arm 51 upon the end of the member 42. After plate member 42 reaches central position, the centrifugal action will assist in forcing it toward non-driving position. After the drive has been interrupted, and the parts are in the position in Figure 4, if the motor is stopped, the spring 46 will swing the plate member 42 to driving position, since there is no longer any opposition to the movement of the plate member 42 and the latch 48 by reason of centrifugal action. Such movement will not occur, however, until the speed of rotation is practically zero, and chattering or ratcheting of the finger 44 upon the abutment 41 as it approaches driving position is avoided.

The clutch parts are preferably shielded from dust and moisture by a tubular casing 53, preferably of light metal, shaped to surround the upper end of the pulley so as to be engaged by the felt strip 39, and having its upper end crimped into place upon the upper circular portion of the body member 27 as shown at 54. An opening 55 is preferably provided through the casing member 53 and extending into the body portion 27, to receive a spanner wrench or other tool by which the clutch and pulley assembly, as a unit, may be conveniently mounted upon the threaded end of the motor shaft.

In the embodiment shown in Figures 10 to 17, a clutch body member 56 is utilized which is of simple construction, having an enlarged head which is threaded upon the motor shaft 13, and a reduced lower end 57, upon which pulley 58 is rotatably mounted, a bushing of graphite-embedded, anti-friction composition being provided between the parts to avoid unusual heating if the motor is continued in operation when the pulley is stalled. The pulley 58 is formed with an upwardly extending portion provided with a laterally extending cam 59, and a driving member 60 and a latch member 61 are mounted, respectively, upon studs 62 and 63, which are preferably identical, riveted in place in the upper enlarged portion of the body member 56 and extending parallel to the axis of the lower reduced portion 57. As shown in Figure 17, the driving member 60 may be formed as a sheet-metal stamping comprising laterally spaced arcuate plates between which a roller 64 is pivotally mounted, and a counterweight 65 is riveted or spot welded, or otherwise secured, to one side member, the side members having openings 66 so that the element as a whole can be pivotally mounted upon the stud 62, with a helical spring 67 surrounding the stud and having one end in engagement with the member 60 and the other end engaging the main body member 56, so as normally to force the roller 64 inwardly into the path of the cam or abutment 59.

As shown in Figure 15, the latch member 61, which also may be conveniently formed as a sheet metal stamping, has a long arm which is curved and lies between the planes of the side members of the driving member 60, tabs 69 being bent in from its edges and perforated to facilitate mounting upon stud 63, and its shorter end being bent inwardly and then outwardly as shown at 70, in Figures 12, 13, and 15, to engage frictionally against the end of member 60 in normal driving position, and to act as a pawl or latch for holding the member 60 out of driving position as shown in Figure 12. The studs 62 and 63 are preferably provided with enlargements 71, and screws 72 and washers 73 may conveniently be used to hold the driving member 60 and the latch 61 upon their studs. In order to lubricate the anti-friction bushing 68, the lower end 57 of the body member upon which it is mounted is preferably provided with oil grooves 74 communicating with an oil port 75 extending to a central reservoir 76, which is closed by the screw 77, by which the pulley is held in assembled relation. A dust-excluding packing ring 78, located in a groove in the pulley, and a tubular casing 79, crimped at its upper end to the body member 56, are preferably provided as in the other embodiments.

It will be apparent that this embodiment of the invention can be economically manufactured and that its operation will be substantially like that of the structures shown in Figures 2 to 9, the provision of the roller 64 materially lessening the chances of variation in operation which might otherwise result from wear of the engaging surfaces of the driving member and the abutment on the pulley upon repeated operation.

In the embodiment shown in Figures 18 to 26 a clutch body member 80 is threaded upon the lower end of the motor shaft 13 and has a reduced lower end rotatably supporting the pulley 81 upon an anti-friction bushing 82, the upper part of the pulley being provided with a radially extending abutment 83, and the clutch mechanism being protected from dust by a packing ring 84 and a tubular casing 85, which is crimped in place about the upper end of the body member. A driving member 86 and a weighted latching lever 87 are pivotally mounted upon studs 88 and 89, respectively, which are riveted to the upper portion of the body member 80 and extend parallel to its axis, the free end of the driving member and the latching lever being connected by a link 90 and a pivot pin 90a, so that, as shown in Figure 20, the centrifugal action transmitted from the lever through the link to the driving member will normally tend to hold it in driving relationship. When the driving member 86 has been forced out of driving relationship, as shown in Figure 21, the latching lever 87, through the link 90, will hold the driving member out of driving position, the connection of the parts being such as to provide an over-center, toggle action. A spring 91 surrounds the stud 88, one end engaging the driving member 86 and the other end engaging the casing 85 and normally tending to move the driving member 86 toward driving position, a screw 92 preferably being used to hold the spring and the driving member in place upon the stud 88. As shown in Figure 25 the driving member may conveniently be formed of a stamping of sheet metal having its sides bent to parallel relationship at right angles to the body portion thereof.

In general, the operation of this embodiment will be substantially the same as that of the embodiments previously described, and the effect of the toggle action between the parts will be to prevent the possibility of their occupying any intermediate position for any great length of time, the centrifugal action upon the lever 87 acting to throw the driving member 86 either to one side or the other of its center position. The parts can be economically manufactured and readily assembled, and the driving member will be positively held out of driving position by the centrifugal action upon the latch lever 87, until the rotation of the body member 80 has substantially ceased, and such centrifugal action can no longer overcome the action of the spring 91.

In all of the embodiments shown and described, not only will danger of breakage or injury to the parts be avoided by the automatic release of the clutch, but the drive will be automatically reestablished when the motor is deenergized before the driving shaft comes to rest. The clutch parts will not gradually approach driving position, in which case there would be a ratcheting of the parts which would rapidly wear down the engaging surfaces and thus alter the load at which the clutch would release, but are quickly disengaged or engaged, the driving member moving to or from its driving position in a manner similar to the movement of the contact member of a double snap electric switch. While the stopping of the agitating means, or other driven member, and the change in speed of the motor would normally furnish sufficient audible warning that the motor should be stopped and the obstruction removed, the provision of anti-friction bearings between the pulley and its mounting permit long continued operation of the motor and functioning of the device while the agitating device, or other driven member, is stalled without injurious heating.

It will be understood that in all of the embodiments the body port of the clutch is adapted to be detachably secured to a shaft terminal and that the pulley, or other power transmitting member, is carried by such body member, so that all of such parts constitute a single assembly and can be handled as a unit. While the fan, or a similar member, could be secured to the shaft by other means, it is preferable that, as shown, the body member of the clutch be used as a nut to secure such member in place.

It will also be apparent that many changes may be made in arrangement of the parts and the drive from the motor shaft to the agitating or other driven device, so long as the clutch is located between the driving shaft and the driven device, and that numerous other changes may be made in similar details of construction within the scope of the invention disclosed in the embodiments thereof shown and described, such invention being defined in the following claims.

What is claimed is:

1. A power transmitting device, comprising rotatably mounted driving and driven members, said driven member having an abutment thereon and said driving member having a part pivotally mounted thereon provided with a finger movable into and out of the path of movement of said abutment, the center of mass of said pivoted part being nearer the axis of rotation of said driving and driven members at an intermediate position than at its end positions, whereby said finger will be urged centrifugally either toward or from abutment-engaging position.

2. A power transmitting device, comprising a driving portion adapted to be detachably connected to a driving shaft, a driven portion having a pulley, said portions having projections thereon normally cooperating to transmit rotary motion, one of said projections being movable out of the path of the other of said projections, and a member controlled by centrifugal force to directly engage said movable projection to hold the same in disengaged position, said driven portion and said holding member being assembled as a unit with said driving portion.

3. A power transmitting device, comprising a body member adapted to be connected to a driving shaft, a second member having a power transmitting portion, said members having projections normally cooperating to transmit rotary motion, the projection on said body member being movably mounted thereon and adapted to be forced out of the path of the projection on said second member upon a predetermined overload on said power transmitting portion, and a third member controlled by centrifugal force to directly engage said movable projection to hold the same in disengaged position, said second member being mounted as a unit with and carried by said body member.

4. A power transmitting clutch unit, comprising a body member adapted to be connected to a driving shaft and having a shaft portion thereon, a second member rotatably mounted on said shaft portion and having a power transmitting portion, clutch parts for transmitting drive from said body member to said second member, one of said parts being movable upon overload on said power transmitting portion out of the path of the other of said parts, centrifugally-operated means for holding said parts disengaged, and a housing carried by said body member and surrounding said body member and said power transmitting portion and enclosing said clutch parts and said centrifugally-operated means.

5. A power transmitting clutch unit, comprising a body member adapted to be connected to a driving shaft, a second member having a power transmitting portion, said members having projections cooperating to transmit rotary motion, one of said projections being movable to and from the path of the other of said projections upon overload upon said power transmitting portion, one of said projections having a rotatably mounted roller, and a third member controlled by centrifugal force to directly engage said movable projection to hold the same in disengaged position, all of said parts other than said body member being assembled as a unit with and supported by said body member.

6. A power transmitting clutch unit, comprising a body member adapted to be connected to a driving shaft and having a shaft portion thereon, a second member rotatably mounted on said shaft portion and having a power transmitting portion, said second member having a projection thereon, a projection pivotally mounted on said body member on an axis substantially perpendicular to the axis of said shaft portion and adapted to be forced out of the path of the projection on said second member upon overload on said power transmitting portion, and a centrifugally-operated member mounted on said body member on an axis parallel to the axis of said pivotally mounted projection for holding the projection on said body member out of engagement with the projection on said second member.

7. A power transmitting clutch unit, comprising a body member adapted to be connected to a driving shaft, a second member having a power transmitting portion and a projection, an arm pivotally mounted on said body member and having a projection thereon movable into and out of the path of said projection on said second member and adapted to transmit rotary motion to said second member when engaged with the projection thereon, a centrifugally-operated member mounted on said body member, and a link connecting said centrifugally-operated member and said pivotally mounted arm.

8. A power transmitting device, comprising rotatably mounted driving and driven members, said driven member having an abutment thereon and said driving member having a part pivotally mounted thereon provided with a projection for engagement with said abutment to transmit driving torque, said part being movable from a position in which said projection engages said abutment through an intermediate position to a position in which said projection is entirely out of the path of movement of said abutment, and a centrifugally operated member carried by said driving member exerting a thrust upon said part substantially in the direction of the point at which said part is pivoted to said driving member.

9. A power transmitting device, comprising rotatably mounted driving and driven members, said driven member having an abutment thereon and said driving member having a part mounted thereon provided with a projection for engagement with said abutment to transmit driving torque, said projection being movable from abutment-engaging position through an intermediate position to a position in which it is entirely out of the path of movement of said abutment, and a centrifugally-operated member carried by said driving member, said part and said centrifugally-operated member being so constructed and arranged that the centrifugal force acting on them will tend to hold said projection in abutment-engaging position until it has been forced to its intermediate position and will thereafter tend to force said projection away from the path of said abutment.

10. A power transmitting device, comprising a body member adapted to be connected to a drive shaft, driven means rotatably mounted on said body member, driving means pivotally mounted on said body member and at all times urged toward engagement with said driven means and adapted to transmit rotary motion to said driven means when engaging the same, and centrifugally operated latch means pivotally mounted on said body member and responsive to the speed of rotation of the same to hold said driving means in said engaged position with said driven means.

11. A power transmitting device, comprising a body member adapted to be connected to a drive shaft, driven means rotatably mounted on said body member, driving means pivotally mounted on said body member movable into and out of engagement with said driven means and adapted to transmit rotary motion to said driven means when engaging the same, and centrifugally operated latch means pivotally mounted on said body member and responsive to the speed of rotation of the same to hold said driving means in said engaged position and adapted to hold said driving means in said disengaged position when said driving means has been disengaged from said driven means by overload upon the latter.

12. A power transmitting device, comprising a body member adapted to be connected to a drive shaft, driven means, driving means pivotally mounted on said body member and having a rotatably mounted roller movable into and out of engagement with said driven means and adapted to transmit rotary motion to said driven means when engaging the same, and centrifugally operated latch means pivotally mounted on said body member and responsive to rotation of the same to hold said driving means in its engaged position with said driven means.

13. An overload release, comprising a body member connectible to a drive shaft, driven means, pivotally mounted drive means movable into and out of engagement with said driven means, means urging said drive means into engagement with said driven means to transmit rotary motion to the latter during normal load operation of said driven means, said urging means yielding to abnormal load operation of said driven means to permit the latter to move said drive means out of driving engagement therewith, and centrifugally operated latch means for holding said drive means in and out of engagement with said driven means.

14. An overload release, comprising a body member connectible to a drive shaft, driven means, pivotally mounted drive means controlled by centrifugal force to urge it into engagement with said driven means to transmit rotary motion to the latter during normal load operation of said driven means, abnormal load operation of said driven means overcoming said centrifugal force and moving said drive means out of said engagement therewith, and centrifugally operated latch means for holding said drive means in engagement and disengagement with said driven means.

15. An overload release, comprising a body member connectible to a drive shaft, driven means having an abutment, pivotally mounted drive means having an abutment movable into and out of engagement with said driven abutment, spring means urging said driving abutment into engagement with said driven abutment to transmit rotary motion to said driven means during normal load operation of the latter, said spring means yielding to abnormal load operation of said driven means to permit said driven abutment to move said drive abutment out of engagement therewith, and centrifugally operated latch means for holding said drive means in engagement and disengagement with said driven means.

16. An overload release, comprising a body member connectible to a drive shaft, driven means, drive means having a rotatably mounted roller movable into and out of engagement with said driven means, means urging said roller into engagement with said driven means to transmit rotary motion to the latter during normal load operation of said driven means, said urging means yielding to abnormal load operation of said driven means to permit the latter to move said roller out of driving engagement with said driven means, and centrifugally operated latch means for holding said drive means in and out of engagement with said driven means.

17. An overload release, comprising a body member connectible to a drive shaft, driven means, drive means having a toggle device movable into and out of engagement with said driven means, means urging said toggle device into engagement with said driven means to transmit rotary motion to the latter during normal load operation of said driven means, said urging means yielding to abnormal load operation of said driven means to permit the latter to move said toggle device out of driving engagement with said driven means, and centrifugally operated latch means for holding said drive means in and out of engagement with said driven means.

HARRY B. WHITE.
BERNARD C. BECKER.